United States Patent

Chan

[11] Patent Number: 5,897,613
[45] Date of Patent: Apr. 27, 1999

[54] EFFICIENT TRANSMISSION OF VOICE SILENCE INTERVALS

[75] Inventor: Norman C. Chan, Louisville, Colo.

[73] Assignee: Lucent Technologies Inc., Murray Hill, N.J.

[21] Appl. No.: 08/947,205

[22] Filed: Oct. 8, 1997

[51] Int. Cl.⁶ ........................................................ H04J 3/26
[52] U.S. Cl. .......................... 704/210; 704/201; 704/215; 455/570
[58] Field of Search ..................................... 704/201, 210, 704/215; 455/570

[56] References Cited

U.S. PATENT DOCUMENTS

| | | | |
|---|---|---|---|
| 4,503,533 | 3/1985 | Tobagi et al. | 370/85 |
| 4,696,039 | 9/1987 | Doddington et al. | 381/46 |
| 4,696,040 | 9/1987 | Doddington et al. | 704/258 |
| 5,220,565 | 6/1993 | Wilson et al. | 370/94.1 |
| 5,414,796 | 5/1995 | Jacobs et al. | 395/2.3 |
| 5,541,919 | 7/1996 | Yong et al. | 370/61 |
| 5,694,429 | 12/1997 | Sekine et al. | 375/262 |
| 5,745,380 | 4/1998 | Sandvoss et al. | 364/514 R |
| 5,757,801 | 5/1998 | Arimilli | 370/444 |

*Primary Examiner*—David R. Hudspeth
*Assistant Examiner*—Daniel Abebe
*Attorney, Agent, or Firm*—David Volejnicek

[57] ABSTRACT

A silence-suppression scheme for a packet voice transmission system (FIG. 1) accurately regenerates the silence signals at the receiving end. The following discipline is implemented at the transmitting end (100): if speech is detected (200), transmit (204) a packet carrying the speech; if silence is detected (200) and the last-transmitted packet carried speech (202), transmit (204) a packet carrying the silence; if silence is detected (200) and the last-transmitted packet carried silence (202), transmit nothing. The following discipline is implemented at the receiving end (101): if a packet is received during a packet time interval (300), output (302) the contents of the packet; if a packet is not received during a packet time interval (300), output (306) again the contents of the last-received packet. Thus, while only one silence-carrying packet is transmitted, the receiver regenerates silence signals for the entire silence interval. Also, no special transmission protocol is required to implement this scheme.

21 Claims, 2 Drawing Sheets

EFFICIENT TRANSMISSION OF VOICE SILENCE INTERVALS

TECHNICAL FIELD

This invention relates generally to packet transmission systems.

BACKGROUND OF THE INVENTION

Transmission of digitized voice in packet form is becoming widespread. An example thereof are asychronous transfer mode (ATM) transmission systems. To conserve transmission bandwidth, various techniques have been developed that minimize the amount of information that is sent over the transmission channel while maintaining the perceived quality of the reconstructed speech at the receiving end. Fundamental among these techniques is silence suppression, which is a technique that detects silence intervals in the voice stream at the sending end and suppresses the sending of data representing the silence. Illustrative of these techniques is Time-Assigned Speech Interpolation (TASI), which is a speech-compression technique that examines the digitized voice signal before transmission and eliminates the data which represent silence, so that only data which represents actual speech sounds are transmitted. "Silence" in this context means the absence of speech, and includes the presence of sound below some threshold, e.g., background noise.

A problem with this and other techniques which suppress the transmission of silence is that the recipients of the transmitted and reconstructed voice perceive the lack of the background noise which normally accompanies speech during the silence intervals and rate the quality of the transmission as lower than one which does transmit silence. In an attempt to improve the quality of suppressed-silence transmission systems, synthesized "comfort noise" is added by some systems to the reconstituted voice during silence intervals. Although some improvement in quality is achieved thereby, it does not substantially improve the overall perceived quality of the transmission because the "comfort noise" does not model the actual background noise at the speech source.

SUMMARY OF THE INVENTION

This invention is directed to solving these and other problems and disadvantages of the prior art. Generally according to the invention, there is provided a method and an apparatus for transmitting or receiving varying information (e.g., speech signals) interspersed with an interval of substantially unvarying information (e.g., silence) as a sequence of packets (e.g., ATM cells). Transmission is effected thusly: In response to receipt of a segment (e.g., a packet's worth) of the varying information, a packet carrying the received segment is transmitted. Also, in response to receipt of an initial (e.g., the first) segment of the interval of the unvarying information, a packet carrying the received segment is transmitted. But in response to receipt of a segment of the interval of the unvarying information other than the initial segment, no packets are transmitted. Silence suppression and the resulting bandwidth conservation are thus achieved. Then, in response to subsequent receipt of another segment of the varying information, a packet carrying the received segment is again transmitted. This procedure may be repeated for each interval of the unvarying information that is encountered in the communication that is being transmitted.

At the receiving end, reception is effected thusly: In response to receipt of a packet during a time interval (e.g., a time interval corresponding to a packet's worth of the transmitted information), the segment carried by the received packet is transmitted (i.e., is output by the receiver). But in response to a packet not being received during a time interval, the segment of information carried by the last received packet is transmitted. Thus, if the last received packet carries a segment of the unvarying information, the interval of unvarying information is regenerated at the receiver from the one received sample (segment) of the unvarying information and without need to receive the entire interval of unvarying information from the transmitter. More specifically, reception is effected as follows: In response to receipt of a packet carrying a segment of the varying information during a time interval, the segment carried by the received packet is transmitted. Also, in response to receipt of a packet carrying an initial segment of the unvarying information during a time interval, the segment carried by the received packet is transmitted. Then in response to a packet not being received during a subsequent time interval, the initial segment of the unvarying information is again transmitted. Preferably, the time interval during which the packet carrying the initial segment of the unvarying information is received plus subsequent time intervals during which no packet is received together equal the interval of the substantially unvarying information. Finally, in response to a packet carrying a segment of the varying information again being received during a time interval, the segment carried by the packet is transmitted.

While the method comprises the steps of the just-characterized procedure, the apparatus effects the method steps. The apparatus preferably includes an effector—any entity that effects the corresponding step, unlike a means—for each step. The above-characterized method and apparatus effect silence compression and thereby obtain the resulting bandwidth conservation. Yet they do so without substantial loss of quality of the regenerated silence intervals at the receiving end, thereby producing a received voice signal of higher quality than has hitherto normally been achieved with synthesized "comfort noise". Also significantly, these benefits are achieved without a need for any special signaling between the transmitter and the receiver, such as is needed for synthesized "comfort noise" start and stop. In other words, the invention does not require support from the transmission protocol. Consequently, the invention is compatible with, and may be used with, substantially any transmission protocol.

These and other features and advantages of the present invention will become more apparent from the following description of an illustrative embodiment of the invention considered together with the drawing.

DETAILED DESCRIPTION

Figure 1:
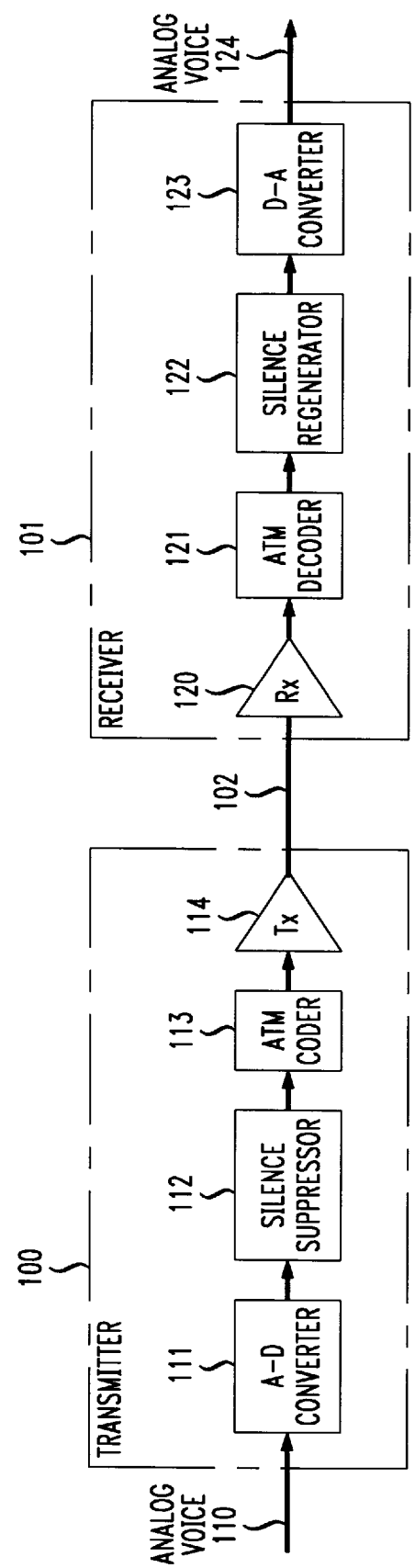
FIG. 1 is a block diagram of a transmission system that includes an illustrative embodiment of the invention.

FIG. 1 shows a speech packet-transmission system comprising a transmitter 100 and a receiver 101 interconnected by a transmission channel 102. Channel 102 can be wired, wireless, optical, or any other desired channel. Transmitter 100 comprises an input 110 for a stream of analog voice signals. "Voice" and "speech" is used herein to refer not only to sound produced by the human vocal chords but also to any analog sound signals. The analog voice signals are received by an analog-to-digital (A-D) converter 111 which converts them into digital signals. The digital signals are input to a silence suppressor 112, which detects silence intervals in the digital signal stream, generally by comparing the signal strength against a predetermined threshold, and eliminates most but not all of the signals which represent silence, i.e., the signals that represent sound having a signal strength that falls below the predetermined threshold for an interval of time.

Figure 2:
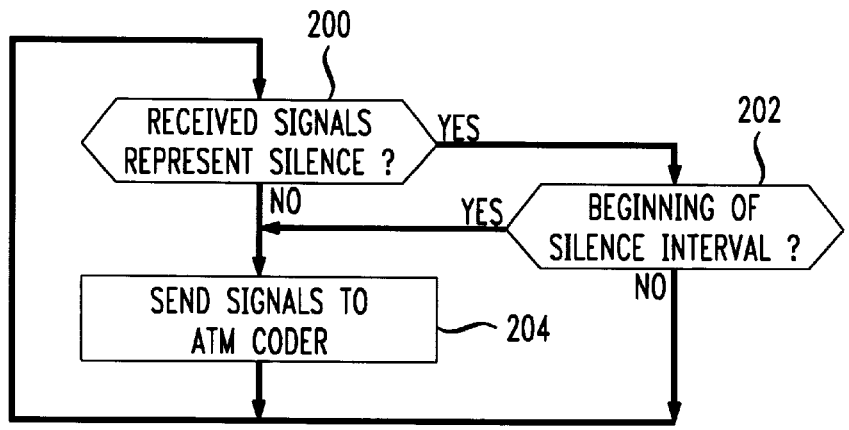
FIG. 2 is a flow diagram of operations of a silence suppressor of the transmission system of FIG. 1.

Operation of silence suppressor 112 is diagrammed in FIG. 2. Silence suppressor 112 repeatedly periodically checks whether the digital signals that it has received from A-D converter 111 represent silence, at step 200. If not, silence suppressor 112 simply sends the signals to an ATM coder 103, at step 204, and then returns to step 200. If the received signals do represent silence, silence suppressor 112 determines if this is the start of a silence interval, at step 202. If so, silence suppressor 112 proceeds to step 204 to send the signals to ATM coder 103. If not, silence suppressor 112 simply returns to step 200. This operation produces an intermittent stream of digital signals representing all speech and the immediate beginning of any silence intervals. This intermittent stream is received by ATM coder 113, which generates ATM cells from the received digital signals and transmits them via a transmitter front end 114 onto channel 102. The net result is that, except for one (or a few) ATM cells at the beginning of every silence interval, no ATM cells carrying silence information are transmitted on channel 102.

Figure 3:
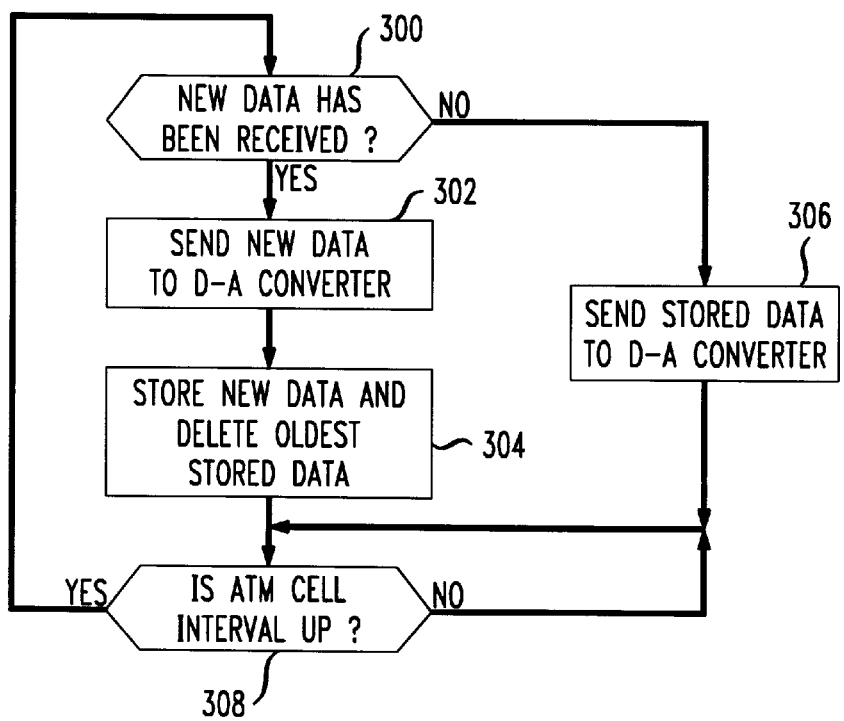
FIG. 3 is a flow diagram of operations of a silence regenerator of the transmission system of FIG. 1.

At receiver 101, the transmitted ATM cells are received from channel 102 by a receiver front end 120 and are input to an ATM decoder 121 which extracts the payload therefrom and passes it as an intermittent signal stream to a silence regenerator 122. Operation of silence regenerator 122 is diagrammed in FIG. 3. Silence regenerator 122 repeatedly periodically (after every ATM cell interval, in this example, at step 308) checks whether new digital signals, i.e., the data payload of a newly-arrived ATM cell, have been received, at step 300. If so, silence regenerator 122 sends the new digital signals on to a D-A converter 123, at step 302, and also stores the digital signals while deleting any but the last one (or a few) previously-saved digital signals, at step 304, and then returns to step 300. If it finds at step 300 that new digital signals are not available, it sends to D-A converter 123 the stored digital signals that it had stored at step 304, at step 306, and then returns to step 300. The result of this operation is that silence regenerator 122 fills in each blank interval in the intermittent data stream that it receives from ATM decoder 121 with copies of the initial silence data received for that interval in one (or a few) ATM cells so as to form a constant data stream that includes silence-representing data, and passes this constant data stream to D-A converter 123. D-A converter 123 converts the received data stream back into an analog voice signal stream and transmits it at an output 124 of receiver 101.

Of course, various changes and modifications to the illustrative embodiment described above will be apparent to those skilled in the art. For example, the invention may be employed not only to avoid transmission of silence data, but may be equally-well employed to avoid transmission of any interval of constant, unvarying data (e.g., a tone), simply by transmitting only a first sample of the data interval and leaving it up to the receiver to regenerate the entire interval from the sent sample. Or, multiple ATM cells or other packets may be used to convey the initial segment of the unvarying information (silence). For example, an ATM cell carries 48 samples, and one second of information yields 8000 samples, or 167 ATM cells, while a typical silence interval is 5 seconds, or 835 ATM cells long. If a cycle of 10 ATM cells is used to convey an initial segment of silence, this still represents an average saving of 825 ATM cells. At the same time, the contents of 10 ATM cells can better characterize the silence background noise than the contents of one ATM cell. In the case of a tone, multiple cells may also be needed to properly depict and convey the tone's frequency characteristics, depending on the cell size. Such changes and modifications can be made without departing from the spirit and the scope of the invention and without diminishing its attendant advantages. It is therefore intended that such changes and modifications be covered by the following claims.

What is claimed is:

1. A method of transmitting varying information interspersed with an interval of substantially unvarying information as a sequence of packets, comprising the steps of:

In response to receiving a segment of the varying information, transmitting a packet carrying the received segment;

in response to receiving an initial segment of the interval of the unvarying information, transmitting a packet carrying the received segment;

in response to receiving a segment of the interval of the unvarying information other than the initial segment not transmitting a packet; and in response to receiving a segment of the varying information subsequently to receiving the segments of the interval of the unvarying information, transmitting a packet carrying the received segment.

2. A method of receiving varying information interspersed with an interval of substantially unvarying information as a sequence of packets, comprising the steps of:

in response to receiving a packet during a time interval, transmitting a segment of information carried by the received packet; and in response to not receiving a packet during a time interval, transmitting a segment of information carried by a last received packet;

wherein the received packets other than the last received packet carry segments of the varying information and the last received packet carries a segment of the unvarying information.

3. The method of claim 2 wherein:

the time interval during which the packet carrying the initial segment of the interval of the unvarying information is received plus subsequent time intervals during which no packet is received equal the interval of the substantially unvarying information.

4. A method of receiving varying information interspersed with an interval of substantially unvarying information as a sequence of packets, comprising the steps of:

in response to receiving a packet carrying a segment of the varying information during a time interval, transmitting the segment carried by the received packet;

in response to receiving a packet carrying an initial segment of the interval of the unvarying information during a time interval, transmitting the segment carried by the received packet;

in response to not receiving a packet during a subsequent time interval, transmitting again the initial segment of the unvarying information; and in response to again receiving a packet carrying a segment of the varying information during a time interval, transmitting the segment carried by the received packet.

5. The method of claim 4 wherein:
the time interval during which the packet carrying the initial segment of the interval of the unvarying information is received plus subsequent time intervals during which no packet is received equal the interval of the substantially unvarying information.

6. A method of transmitting voice signals comprising speech signals interspersed with silence signals, comprising the steps of:
in response to detecting speech signals in the voice signals, transmitting packets carrying the detected speech signals;
in response to commencing to detect silence signals in the voice signals, transmitting a packet carrying the detected silence signals;
in response to continuing to detect silence signals in the voice signals, not transmitting any packets; and
in response to again detecting speech signals in the voice signals, again transmitting packets carrying the detected speech signals.

7. A method of receiving voice signals comprising speech signals interspersed with silence signals, comprising the steps of:
in response to receiving packets carrying the voice signals, outputting the carried voice signals;
in response to ceasing to receive the packets carrying the voice signals, repeatedly outputting the voice signals carried by a last received one of the received packets until resumption of receipt of packets; and
in response to resuming to receive packets carrying the voice signals, resuming outputting of the carried voice signals;
wherein the received packets other than the last received packet carry the speech signals and the last received packet carries a sample of the silence signals.

8. The method of claim 7 wherein:
an interval of time during which the last received packet is received plus intervals of time during which no packets carrying the voice signals are received equal a time of duration of the silence signals.

9. A method of receiving voice signals comprising speech signals interspersed with silence signals, comprising the steps of:
in response to each time interval during which a packet carrying a segment of the voice signals is received, transmitting the segment carried by the received packet; and
in response to each time interval during which a packet carrying a segment of the voice signals is not received, transmitting the segment carried by a last received one of the received packets carrying a segment of the voice signals until resumption of receipt of packets;
wherein the received packets other than the last received packets carry segments of the speech signals and the last received packet carries a segment of the silence signals.

10. The method of claim 9 wherein:
the time interval during which the last received packet is received plus the intervals of time during which no packets carrying a segment of the voice signals are received equal a time of duration of the silence signals.

11. An apparatus that performs the method of claim 1 or 2 or 3 or 4 or 5 or 6 or 7 or 8 or 9 or 10.

12. An apparatus for transmitting varying information interspersed with an interval of substantially unvarying information as a sequence of packets, comprising:

an effector, responsive to receiving either a segment of the varying information or an initial segment of the interval of the unvarying information, of transmitting a packet carrying the received segment; and
an effector, responsive to receiving a segment of the interval of the unvarying information other than the initial segment, of not transmitting a packet;
the effector of transmitting a packet further responsive to receiving a segment of the varying information subsequently to receiving the segments of the interval of the unvarying information, by transmitting a packet carrying the received segment.

13. An apparatus for receiving varying information interspersed with an interval of substantially unvarying information as a sequence of packets, comprising:
an effector, responsive to receiving a packet during a time interval, of transmitting a segment of information carried by the received packet; and
an effector, responsive to not receiving a packet during a time interval, of transmitting a segment of information carried by a last received packet;
wherein the received packets other than the last received packet carry segments of the varying information and the last received packet carries a segment of the unvarying information.

14. The apparatus of claim 13 wherein:
the time interval during which the packet carrying the initial segment of the interval of the unvarying information is received plus subsequent time intervals during which no packet is received equal the interval of the substantially unvarying information.

15. An apparatus for receiving varying information interspersed with an interval of substantially unvarying information as a sequence of packets, comprising:
an effector, responsive to receiving either a packet carrying a segment of the varying information or a packet carrying an initial segment of the interval of the unvarying information during a time interval, of transmitting the segment carried by the received packet; and
an effector, responsive to not receiving a packet during a subsequent time interval, of transmitting again the initial segment of the unvarying information; and
the effector of transmitting the segment carried by the received packet further responsive to again receiving a packet carrying a segment of the varying information during a time interval subsequent to not receiving a packet during a time interval, by transmitting the segment carried by the received packet.

16. The apparatus of claim 15 wherein:
the time interval during which the packet carrying the initial segment of the interval of the unvarying information is received plus subsequent time intervals during which no packet is received equal the interval of the substantially unvarying information.

17. An apparatus for transmitting voice signals comprising speech signals interspersed with silence signals, comprising:
an effector responsive to detecting speech signals in the voice signals, of transmitting packets carrying the detected speech signals;
an effector responsive to commencing to detect silence signals in the voice signals, of transmitting a packet carrying the detected silence signals; and
an effector responsive to continuing to detect silence signals in the voice signals, of not transmitting any packets;

the effector of transmitting packets further responsive to again detecting speech signals in the voice signals, subsequent to detecting silence signals in the voice signals, of again transmitting packets carrying the detected speech signals.

18. An apparatus for receiving voice signals comprising speech signals interspersed with silence signals, comprising:

an effector, responsive to receiving packets carrying the voice signals, of outputting the carried voice signals; and an effector, responsive to ceasing to receive the packets carrying the voice signals, of repeatedly outputting the voice signals carried by a last received one of the received packets until resumption of receipt of packets;

the effector of outputting the carried voice signals further responsive to resuming to receive packets carrying the voice signals following ceasing to receive the packets, by resuming outputting of the carried voice signals;

wherein the received packets other than the last received packet carry the speech signals and the last received packet carries a sample of the silence signals.

19. The apparatus of claim 18 wherein:

an interval of time during which the last received packet is received plus intervals of time during which no packets carrying the voice signals are received equal a time of duration of the silence signals.

20. An apparatus for receiving voice signals comprising speech signals interspersed with silence signals, comprising:

an effector, responsive to each time interval during which a packet carrying a segment of the voice signals is received, of transmitting the segment carried by the received packet; and an effector, responsive to each time interval during which a packet carrying a segment of the voice signals is not received, of transmitting the segment carried by a last received one of the received packets carrying a segment of the voice signals until resumption of receipt of packets;

wherein the received packets other than the last received packets carry segments of the speech signals and the last received packet carries a segment of the silence signals.

21. The apparatus of claim 20 wherein:

the time interval during which the last received packet is received plus the intervals of time during which no packets carrying a segment of the voice signals are received equal a time of duration of the silence signals.

* * * * *